US007815511B2

(12) United States Patent
Habara

(10) Patent No.: US 7,815,511 B2
(45) Date of Patent: Oct. 19, 2010

(54) AUTOMOTIVE SHOCK ABSORBING PROPELLER SHAFT APPARATUS

(75) Inventor: Yasuaki Habara, Tochigi (JP)

(73) Assignee: Showa Corporation, Saitama (JP)

( * ) Notice: Subject to any disclaimer, the term of this patent is extended or adjusted under 35 U.S.C. 154(b) by 423 days.

(21) Appl. No.: 11/901,018

(22) Filed: Sep. 14, 2007

(65) Prior Publication Data

US 2008/0182673 A1 Jul. 31, 2008

(30) Foreign Application Priority Data

Jan. 30, 2007 (JP) ............................ 2007-019998

(51) Int. Cl.
*F16D 3/41* (2006.01)

(52) U.S. Cl. ...................................... 464/134; 464/178

(58) Field of Classification Search ................ 464/134, 464/135, 146, 178, 183, 906; 280/777; 180/384
See application file for complete search history.

(56) References Cited

U.S. PATENT DOCUMENTS 3,044,282 A * 7/1962 Grundy ...................... 464/134
6,328,656 B1 * 12/2001 Uchikawa et al. ........... 464/183
7,226,360 B2 * 6/2007 Lyon et al. .................. 464/146
2007/0293326 A1 * 12/2007 Tokioka ...................... 464/135

FOREIGN PATENT DOCUMENTS

JP 3-7663 1/1991
JP HEI 10 035304 2/1998

* cited by examiner

*Primary Examiner*—Greg Binda
(74) *Attorney, Agent, or Firm*—Orum & Roth LLC

(57) ABSTRACT

In an automotive shock absorbing propeller shaft apparatus, when a first yoke stub provided in an end portion of a first propeller shaft, and a second yoke stub provided in an end portion of a second propeller shaft are coupled with each other by a cross pin so as to be bendable, the first and second yoke stubs are bent with each other to a fixed maximum bending angle via the cross pin, bending angle control portions coming into collision with each other are provided respectively in shoulder surfaces of fork-shaped protruding portions opposing to each other in an axial direction.

4 Claims, 8 Drawing Sheets

18
101B
17
50
101A
53
52
20
10
15
101C
101
51
201
21
11
16
13
16A
16B
14
12

1
20
50
18
15
10
40
70
30
60
28
25
20

50
52
53
51
101
101A
101C
101B
18
17
15
16
16A
16B
13
12
14
10
11
20
21
201

31
30
32C
80
81
62
61
32
63
60
36
23
33
22
34
35
29A
29
29C
29B
26B
27
24
28
25
26
21
26A
20

AUTOMOTIVE SHOCK ABSORBING PROPELLER SHAFT APPARATUS

FIELD OF THE INVENTION

The present invention relates to an automotive shock absorbing propeller shaft apparatus.

DESCRIPTION OF THE RELATED ART

In a motor vehicle, as described in Japanese Patent Application Laid-open No. 10-35304 (patent document 1), an output of a drive unit constituted by an engine, a transmission and the like in a front side of a vehicle body is transmitted to a rear wheel from a differential gear in a rear side of the vehicle body via first and second propeller shafts and the like. The first and second propeller shafts are coupled by a universal joint in order to absorb a relative displacement between the drive unit in the front side and the differential gear so as to be capable of transmitting an output. The universal joint is structured such that a first yoke stub provided in an end portion of the first propeller shaft and a second yoke stub provided in an end portion of the second propeller shaft are coupled so as to be bendable with each other by a cross pin.

Further, in the motor vehicle, at least one of the first and second propeller shafts is supported to an inner ring of a rubber-like elastic member via a bearing. The rubber-like elastic member is supported to a bracket in a vehicle body side, and the first propeller shaft compresses the second propeller shaft in an axial direction so as to be capable of breaking a shock absorbing portion at a time when the first and second propeller shafts are contracted by being exposed to an impact force. It is thus possible to absorb an impact energy from a front side.

The following problems are generated in the conventional automotive shock absorbing propeller shaft apparatus.

(1) At a time of a collision of the motor vehicle, the first and second propeller shafts are contracted by being exposed to the impact force, and the propeller shafts displace in an axial vertical direction while deforming the rubber-like elastic member with respect to the bracket in the vehicle body side. As a result, there is generated a phenomenon that the first yoke stub in the side of the first propeller shaft and the second yoke stub in the side of the second propeller shaft are significantly bent.

(2) The bending of the first yoke stub and the second yoke stub in the item (1) mentioned above greatly reduces the compressing force at a time when the first and second propeller shafts are bent so as to reduce the compressing force pressing which the first propeller shaft compresses the second propeller shaft in the axial direction, particularly at a time when the bent yoke stub interferes with the vehicle body. This means reducing a level of a breakage of the shock absorbing portion caused by the compressing force, and lowering the shock absorbing effect.

SUMMARY OF THE INVENTION

An object of the present invention is to simply and securely control bending angles of a first yoke stub in a side of a first propeller shaft and a second yoke stub in a side of a second propeller shaft, in an automotive shock absorbing propeller shaft apparatus.

The present invention relates to an automotive shock absorbing propeller shaft apparatus comprising: a first yoke stub provided in an end portion of a first propeller shaft and a second yoke stub provided in an end portion of a second propeller shaft. These elements are coupled to each other by a cross pin so as to be bendable with each other when coupling the first and second propeller shafts. At least one of the first and second propeller shafts is supported to an inner ring of a rubber-like elastic member via a bearing. The rubber-like elastic member is supported to a bracket in a vehicle body side. The first propeller shaft compresses the second propeller shaft in an axial direction so as to be capable of rupturing a shock absorbing portion, at a time when the first and second propeller shafts are contracted by being exposed to an impact force. The first yoke stub is provided with a fork-shaped protruding portion protruding in an axial direction from both sides of a base portion and receiving one pin forming a cross shape of the cross pin. The second yoke stub is provided with a fork-shaped protruding portion protruding in an axial direction from both sides of the base portion and receives the other pin forming the cross shape of the cross pin. The first and second yoke stubs are bent to a fixed maximum bending angle with each other via the cross pin. Bending angle control portions coming into collision with each other are provided in shoulder surfaces of the fork-shaped protruding portions opposing to each other in the axial direction.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 6A and 6B show the first yoke stub, in which FIG. 6A is a cross sectional view, and FIG. 6B is a cross sectional view along a line B-B in FIG. 6A;

FIGS. 8A and 8B show the second yoke stub, in which FIG. 8A is a cross sectional view, and FIG. 8B is a cross sectional view along a line B-B in FIG. 8A.

DESCRIPTION OF THE PREFERRED EMBODIMENTS

Figure 1:
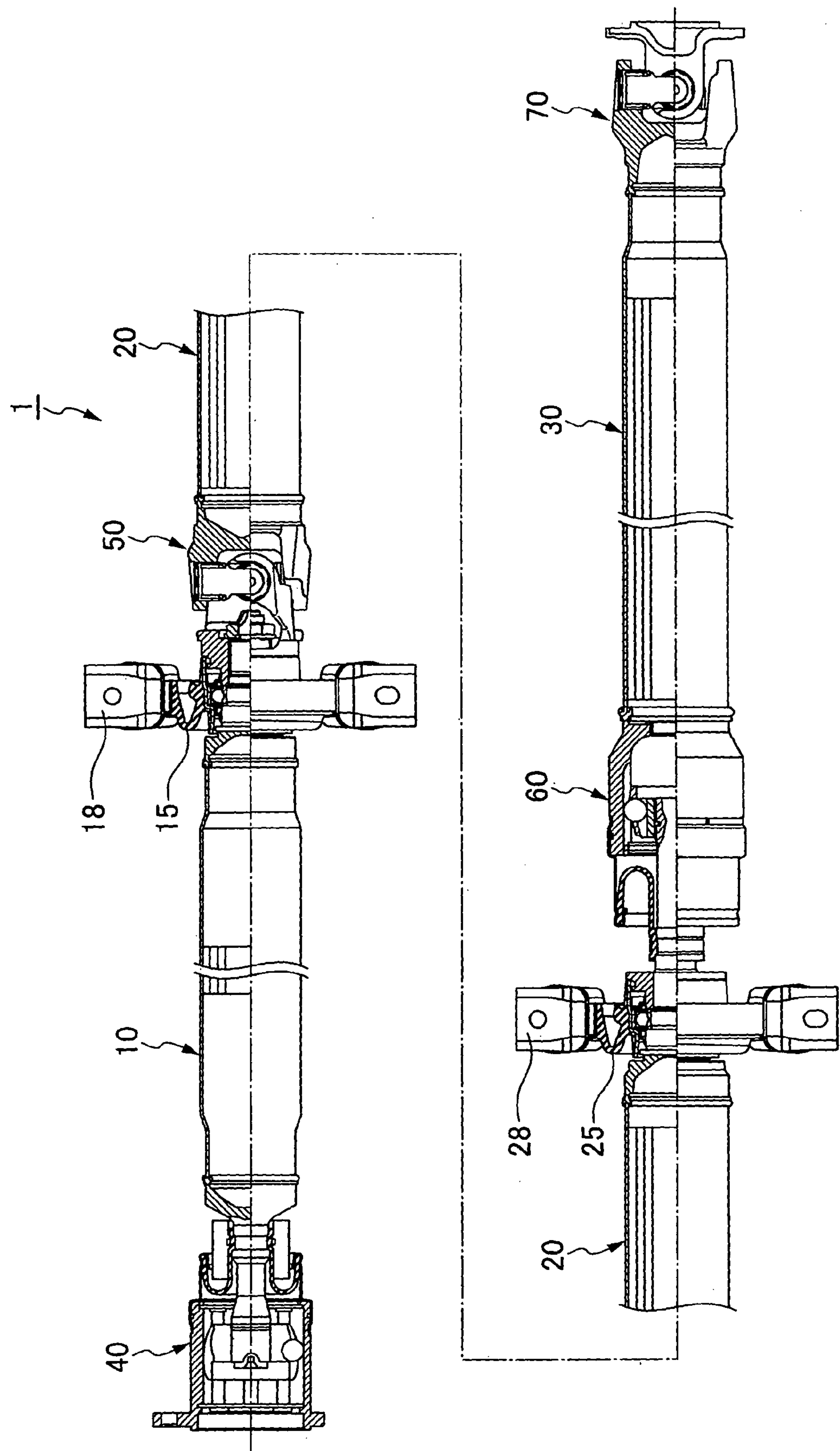
FIG. 1 is a general view showing an automotive shock absorbing propeller shaft apparatus.

An automotive shock absorbing propeller shaft apparatus 1 is a coupled body of divided first, second and third propeller shafts 10, 20 and 30 as shown in FIG. 1. A front end portion of the first propeller shaft 10 is coupled to an output shaft of a transmission in an engine side via a universal joint (a slidable joint) 40. A rear end portion of the first propeller shaft 10 and a front end portion of the second propeller shaft 20 are coupled via a universal joint (a cross joint) 50. A rear end portion of the second propeller shaft 20 and a front end portion of the third propeller shaft 30 are coupled via a universal joint (a slidable joint) 60, and a rear end portion of the third propeller shaft 30 is coupled to a differential gear side via a universal joint (a cross joint) 70.

Figure 2:
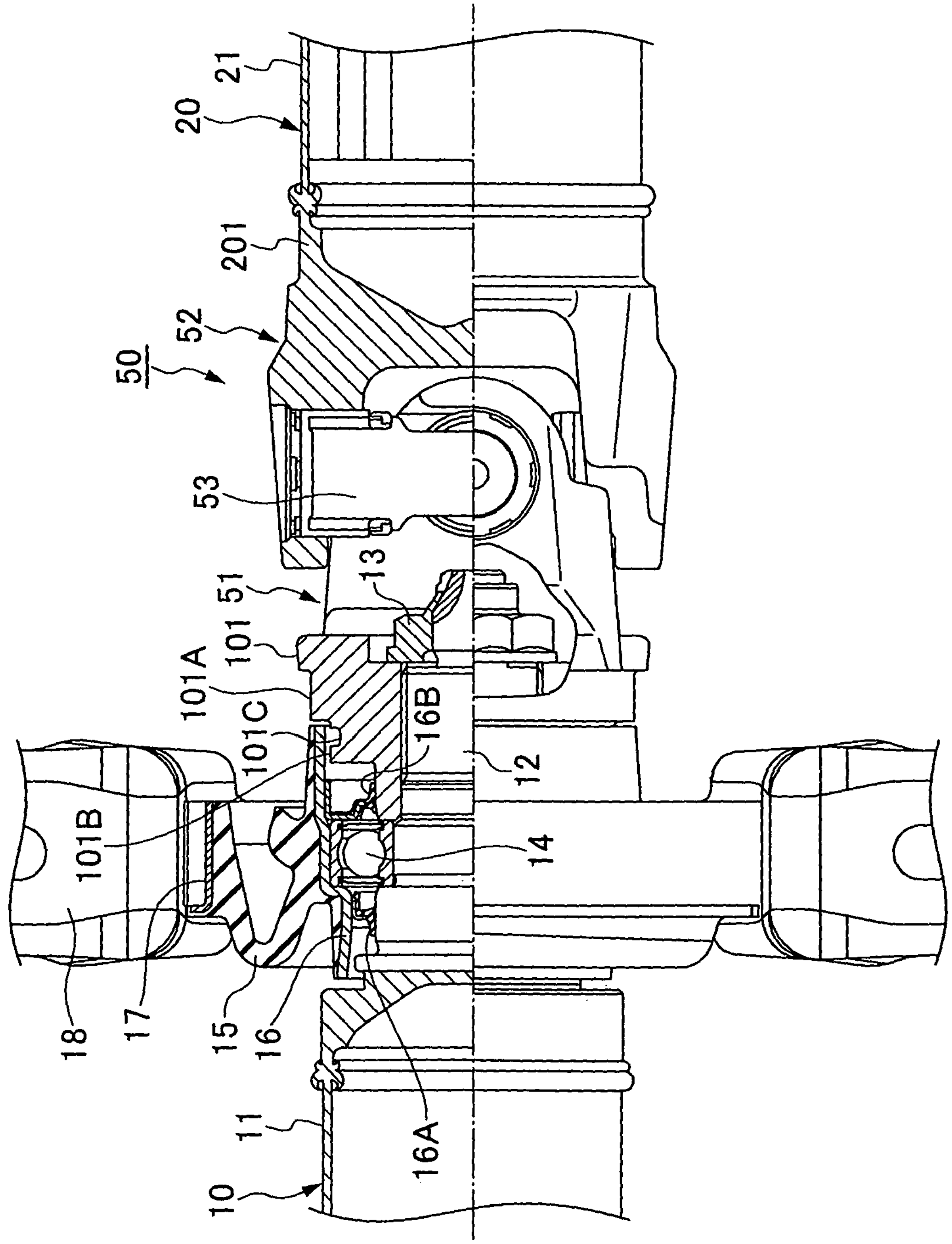
FIG. 2 is a cross sectional view showing an elastic support structure of a propeller shaft and a universal joint.

The first propeller shaft 10 is provided with a coupling shaft 12 in a rear end portion of a hollow pipe 11 in accordance with a friction welding, as shown in FIG. 2. It is structured such that a base portion 101 of a first yoke stub 51 of the universal joint 50 is spline bonded to the coupling shaft 12, and the base portion 101 is sandwiched between an intermediate step portion of the coupling shaft 12 and a nut 13 screwed to a leading end portion of the coupling shaft 12 so as to be fixed. The second propeller shaft 20 is provided with a base portion 201 of a second yoke stub 52 of the universal joint 50 in a front end portion of a hollow pipe 21. Further, the first yoke stub 51 and the second yoke stub 52 are coupled so as to be bendable with each other by a cross pin 53 having a cross shape (having orthogonal X-axis and Y-axis).

Figure 3:
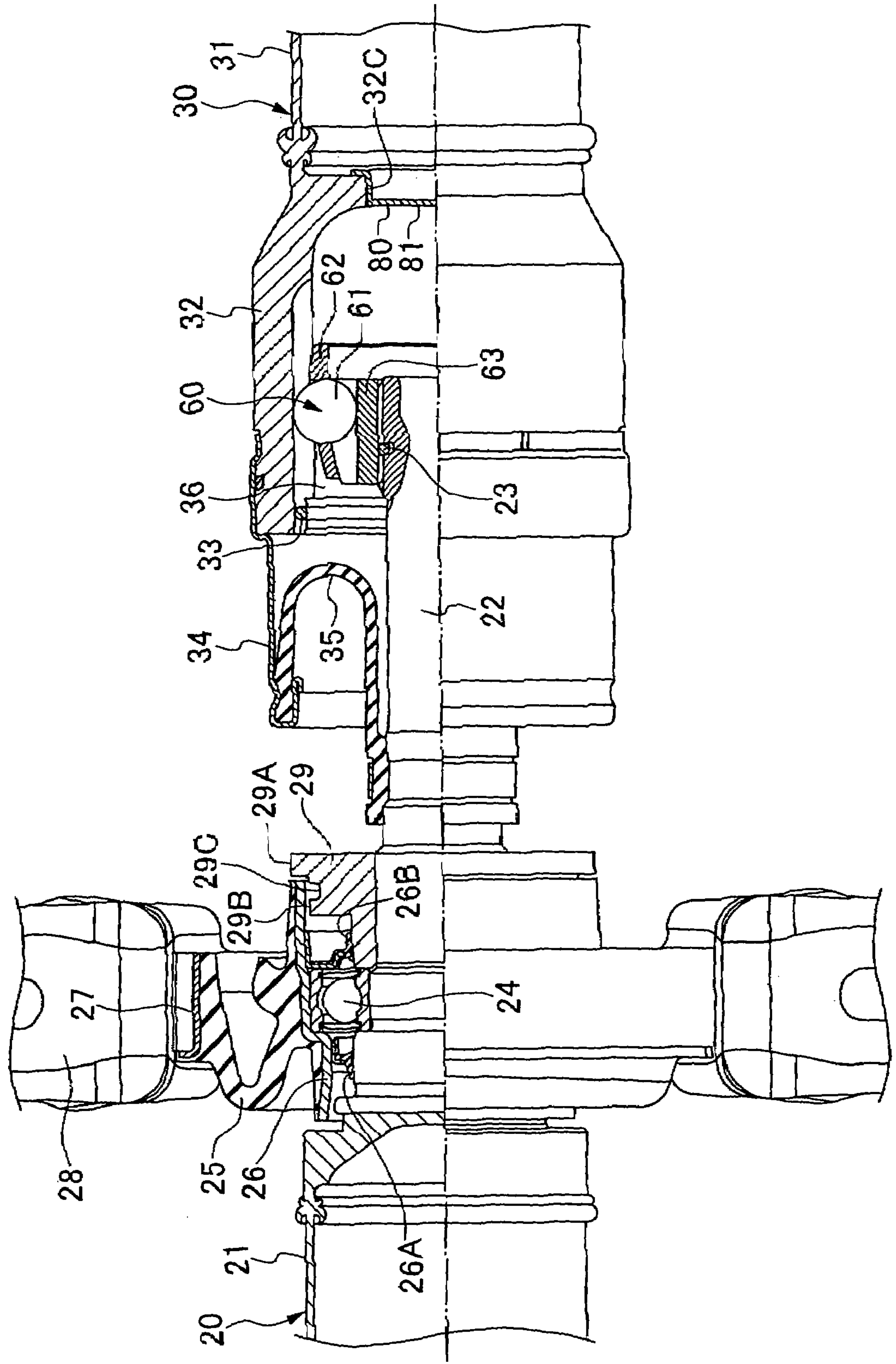
FIG. 3 is a cross sectional view showing a shock absorbing portion of the propeller shaft.

The second propeller shaft 20 is provided with a shaft-like inner element 22 in a rear end portion of the hollow pipe 21 in accordance with a friction welding, as shown in FIG. 3. The third propeller shaft 30 is provided with a tubular outer element 32 in a front end portion of a hollow pipe 31. A leading end portion of the shaft-like inner element 22 is fitted to the tubular outer element 32 via the constant velocity universal joint 60. The universal joint 60 has a ball 61, a ball cage 62 and an inner race 63. The inner race 63 is fixed by a stopper ring 23 as well as spline coupling the inner race 63 to the shaft-like inner element 22. The ball 61 is mounted to a race groove in an inner periphery of the tubular outer element 32 so as to freely roll. The ball 61 is prevented from falling away by a stopper ring 33 engaged and attached to the tubular outer element 32. At this time, both end portions of a rubber boots 35 are attached to a metal tubular boots adapter 34 attached to the front end portion of the tubular outer element 32 of the third propeller shaft 30, and an approximately intermediate portion of the shaft-like inner element 22 of the second propeller shaft 20. The boots adapter 34 and the rubber boots 35 seal a grease charged space 36 between the shaft-like inner element 22 and the tubular outer element 32 for the universal joint 60 with respect to an external field, and prevent a grease leakage and an intrusion of a muddy water from the external portion.

The first propeller shaft 10 is structured, as shown in FIG. 2, such that an intermediate portion of the coupling shaft 12 is supported to an inner ring 16 of a curved rubber-like elastic member 15 via a center bearing 14, thereby being supported to a support bracket 18 in the vehicle body side via an outer ring 17 of the rubber-like elastic member 15. An inner ring of the center bearing 14 is sandwiched between a base end step portion of the coupling shaft 12, and a leading end surface of the base portion 101 of the first yoke stub 51 of the universal joint 50 fixed to the coupling shaft 12 in the manner mentioned above so as to be fixed. In this case, seal members 16A and 16B are mounted to an inner periphery of the inner ring 16, and both the seal members 16A and 16B seal the center bearing 14 from both sides. Further, the base portion 101 of the first yoke stub 51 of the universal-joint 50 is provided with a large-diameter flange portion 101A and a small-diameter flange portion 101B. The large-diameter flange portion 101A comes close to an inner periphery of a rear end of the inner ring 16, and prevents water from making an intrusion into an inner portion of the inner ring 16. The water entering from a gap between the base portion 101 and the inner ring 16 is guided by an annular groove 101C between the large-diameter flange portion 101A and the small-diameter flange portion 101B so as to come down, thereby inhibiting water from making an intrusion into the inner portion of the inner ring 16.

The second propeller shaft 20 is structured, as shown in FIG. 3, such that an intermediate portion of the shaft-like inner element 22 is supported to an inner ring 26 of a curved rubber-like elastic member 25 via a center bearing 24, thereby being supported to a support bracket 28 in the vehicle body side via an outer ring 27 of the rubber-like elastic member 25. An inner ring of the center bearing 24 is sandwiched between a base end step portion of the shaft-like inner element 22, and a leading end surface of a stopper piece 29 inserted and fixed to the shaft-like inner element 22 so as to be fixed. In this case, seal members 26A and 26B are mounted to an inner periphery of the inner ring 26, and both the seal members 26A and 26B seal the center bearing 24 from both sides. Further, the stopper piece 29 is provided with a large-diameter flange portion 29A and a small-diameter flange portion 29B. The large-diameter flange portion 29A comes close to an inner periphery of a rear end of the inner ring 16, and prevents water from making an intrusion into an inner portion of the inner ring 26. The water entering from a gap between the large-diameter flange portion 29A and the inner ring 26 is guided by an annular groove 29C between the large-diameter flange portion 29A and the small-diameter flange portion 29B so as to come down, thereby inhibiting the water from making an intrusion into the inner portion of the inner ring 26.

Further, the propeller shaft apparatus 1 is structured such that a shock absorbing portion 80 is formed in a base end side of the tubular outer element 32 of the third propeller shaft 30. The second propeller shaft 20 and the third propeller shaft 30 are contracted by being exposed to an impact force caused by a collision of the vehicle, and the shock absorbing portion 80 can be ruptured at a time when the shaft-like inner element 22 compresses the tubular outer element 32. The shock absorbing portion 80 in accordance with the present embodiment is pressure inserted to a hole 32C provided in a portion to which the leading end surface of the shaft-like inner element 22 is opposed in an axial direction, in a base end portion of the tubular outer element 32, by a suitable load, and is constructed by a plate (an annular cap) 81 which is burst through by the shaft-like inner element 22. A hole diameter of the hole 32C is smaller than an outer diameter of the inner race 63 of the universal joint 60, which allows the shaft-like inner element 22 to pass through and prevents the inner race 63 from passing through. Accordingly, it is sufficient that a magnitude of the shock absorbing portion 80 in a base end side of the tubular outer element 32 of the third propeller shaft 30 is such a magnitude that a shaft spline portion of the shaft-like inner element 22 passes through, and an inner diameter of the hollow pipe 31 coupled to the tubular outer element 32 can be structured by such a minimum diameter that the shaft spline portion of the shaft-like inner element 22 passes through. In this case, an outer diameter of the inner ring 26 of the rubber-like elastic member 25 is made smaller than an inner diameter of the boots adapter 34, and is made smaller than a bore diameter of an opening of the tubular outer element 32. Further, an outer diameter of the stopper piece 29 for the center bearing 24 is made smaller than the inner diameter of the boots adapter 34, and is made smaller than a bore diameter of the opening of the tubular outer element 32.

A description will be given below of a shock absorbing operation of the propeller shaft apparatus 1.

(1) If the vehicle comes into collision, and the engine and the transmission move back, the first and second propeller shafts 10 and 20 are contracted by being exposed to the impact force, and the first propeller shaft 10 compresses the second propeller shaft 20 in the axial direction.

(2) The load compressing the second propeller shaft 20 to the back side pushes out the center bearing 24, the stopper piece 29 and the inner ring 26 together with the shaft-like inner element 22 backward while deforming the rubber-like elastic member 25.

(3) If the shaft-like inner element 22 of the second propeller shaft 20 moves backward, the inner race 63 of the universal joint 60 fixed to the leading end portion of the shaft-like inner element 22 via the stopper ring 23 moves backward, and the inner race 63 moves to a slide limit position corresponding to a closed end of the race grove of the tubular outer element 32.

(4) If the load pushing out the second propeller shaft 20 backward is further applied, the stopper ring 23 fixing the shaft-like inner element 22 and the inner race 63 of the universal joint 60 comes off, and the leading end portion of the shaft-like inner element 22 further moves backward while leaving the inner race 63 within the tubular outer element 32. Further, the leading end portion of the shaft-like inner element 22 pushes out the shock absorbing portion 80 (the annular cap 81) of the base end portion of the tubular outer element 32 from the hole 32C and enters into the hollow pipe 31 through the hole 32C.

(5) If the load pushing out the second propeller shaft 20 backward is further applied, the stopper piece 29 provided in the outer peripheral side of the shaft-like inner element 22, and the inner ring 26 gets into the inner side of the boots adapter 34 and the opening of the tubular outer element 32. The boots adapter 34 passes through the outer side of the inner ring 26. Further, the stopper piece 29 moves the portion fixed to the shaft-like inner element 22 of the rubber boots 35 to a position sandwiching with respect to the inner race 63 of the universal joint 60.

Accordingly, in the propeller shaft apparatus 1, in order to simply and securely control the bending angles of the first yoke stub 51 in the side of the first propeller shaft 10 and the yoke stub 52 in the side of the second propeller shaft 20 at a time when the first propeller shaft 10 and the second propeller shaft 20 are contracted by being exposed to the impact force, the following structures are provided.

The first yoke stub 51 is provided with fork-shaped protruding portions 102 and 102 protruded in an axial direction from both sides of the base portion 101, as shown in FIGS. 4 to 6B, and the fork-shaped protruding portions 102 and 102 are provided with pin holes 103 and 103 receiving one pin (the X axis) forming the cross shape of the cross pin 53. The second yoke stub 52 is provided with fork-shaped protruding portions 202 and 202 protruded in an axial direction from both sides of the base portion 201, as shown in FIGS. 4, 7, 8A and 8B, and the fork-shaped protruding portions 202 and 202 are provided with pin holes 203 and 203 receiving the other pin (the Y axis) forming the cross shape of the cross pin 53.

Figure 4:
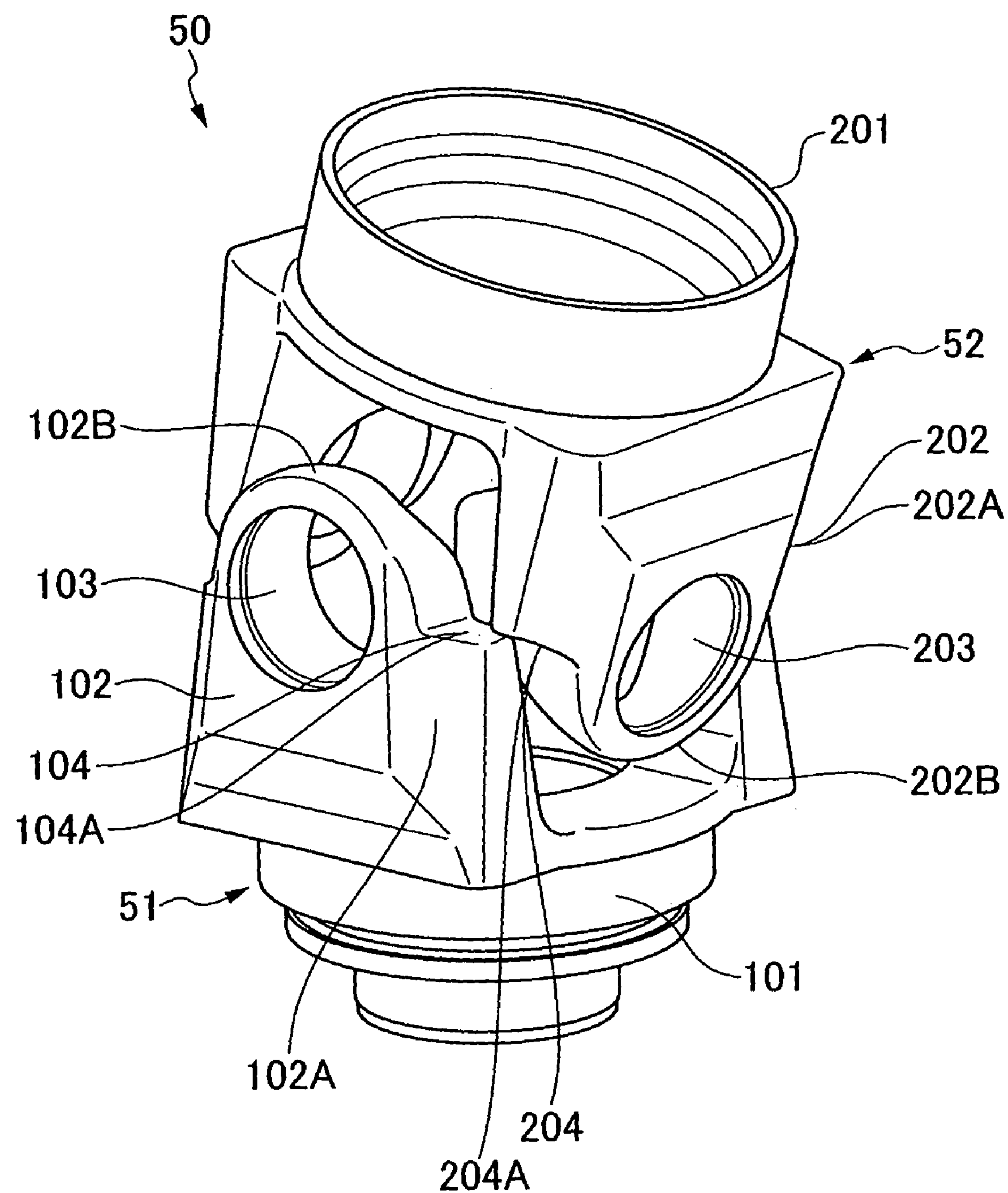
FIG. 4 is a perspective view showing the universal joint.
Figure 5:
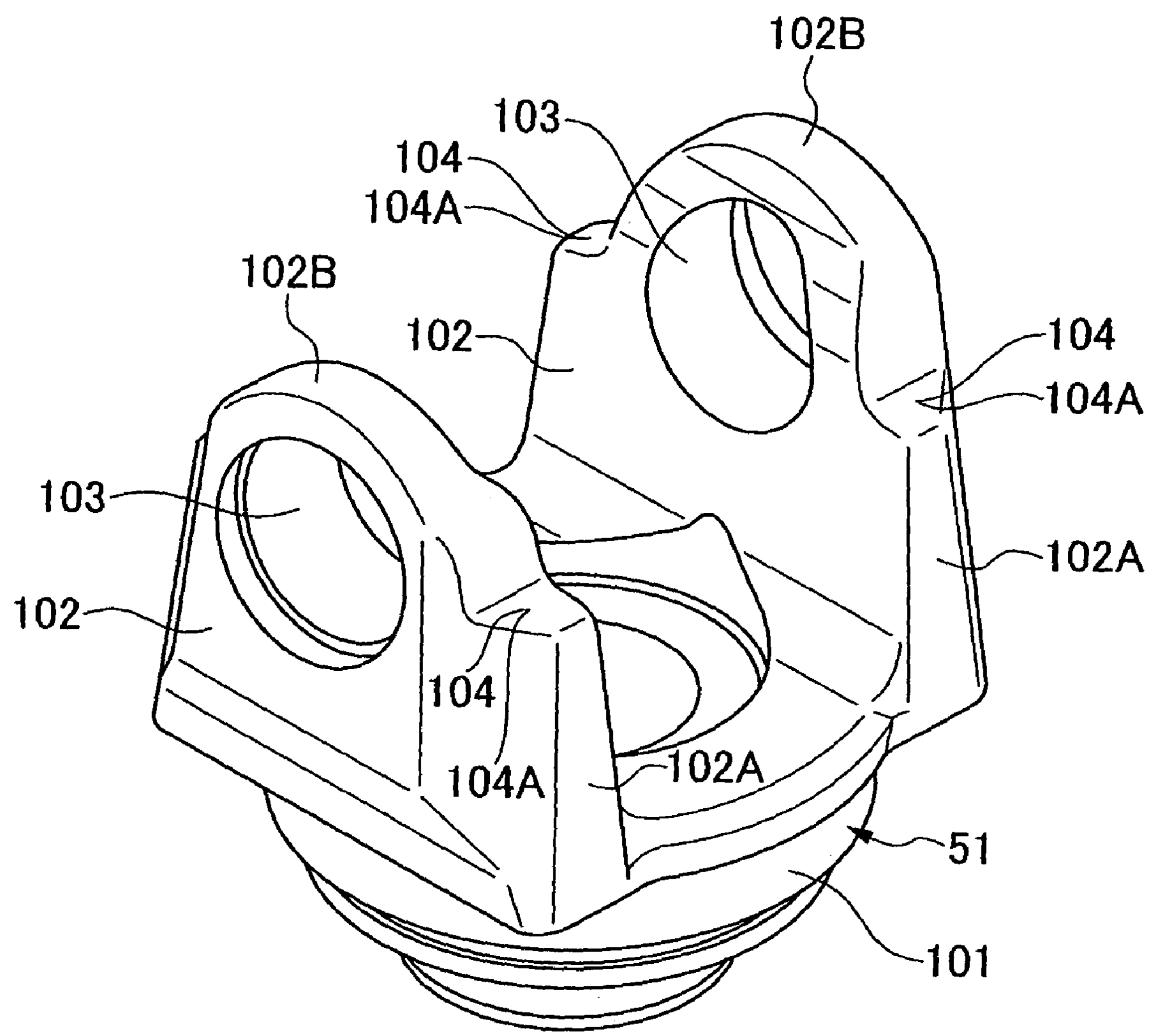
FIG. 5 is a perspective view showing a first yoke stub.
Figure 6A:
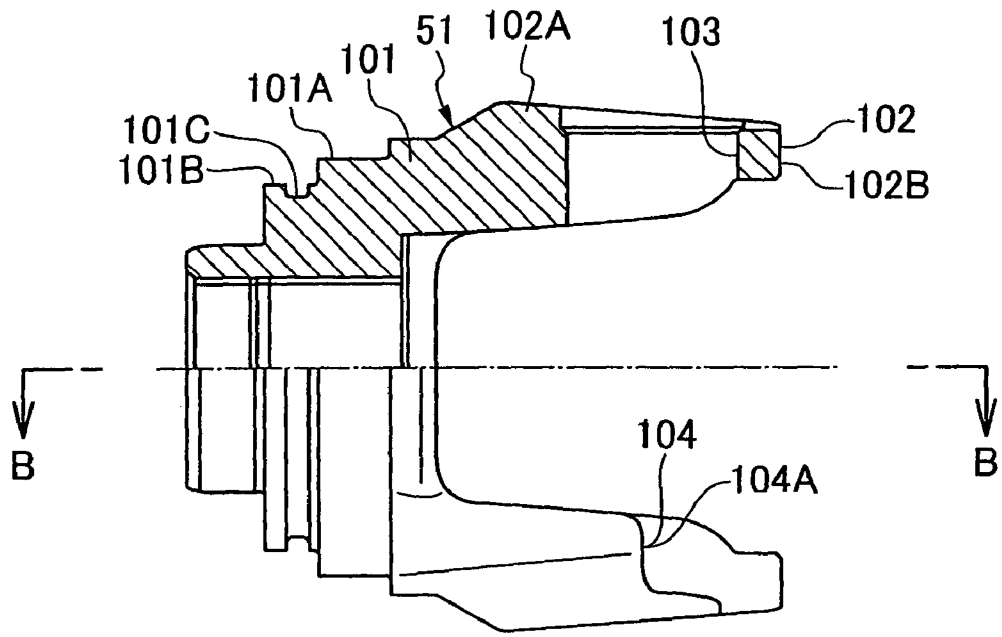
Figure 6B:
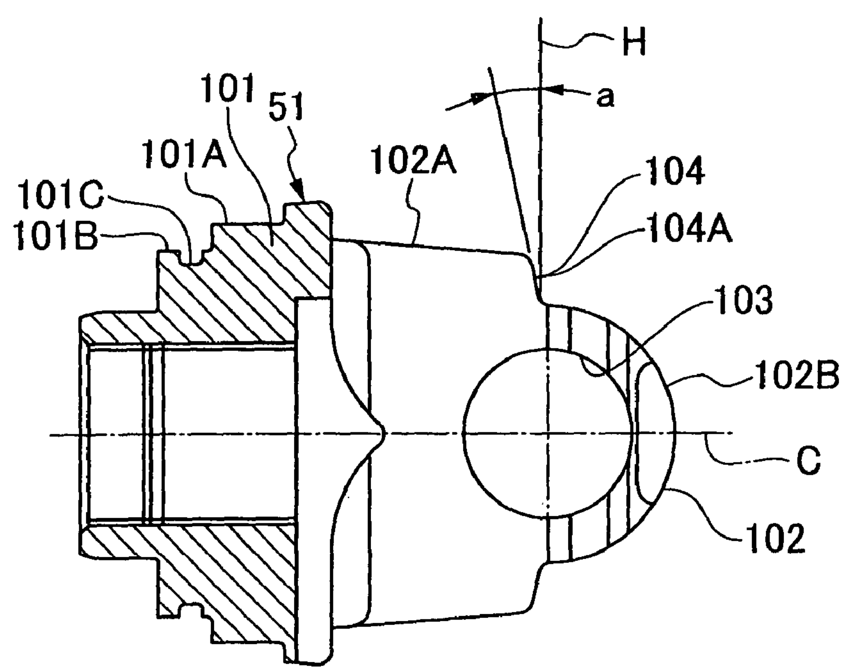
Figure 7:
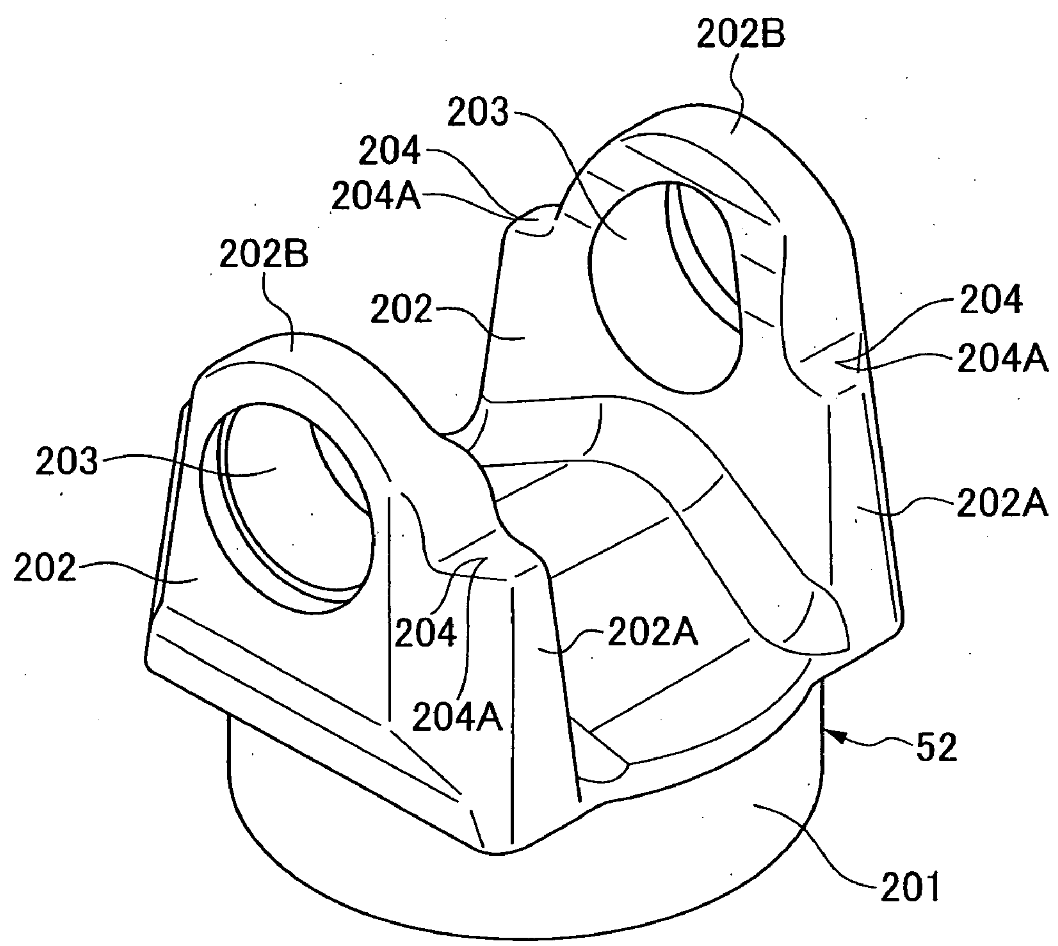
FIG. 7 is a perspective view showing a second yoke stub.
Figure 8A:
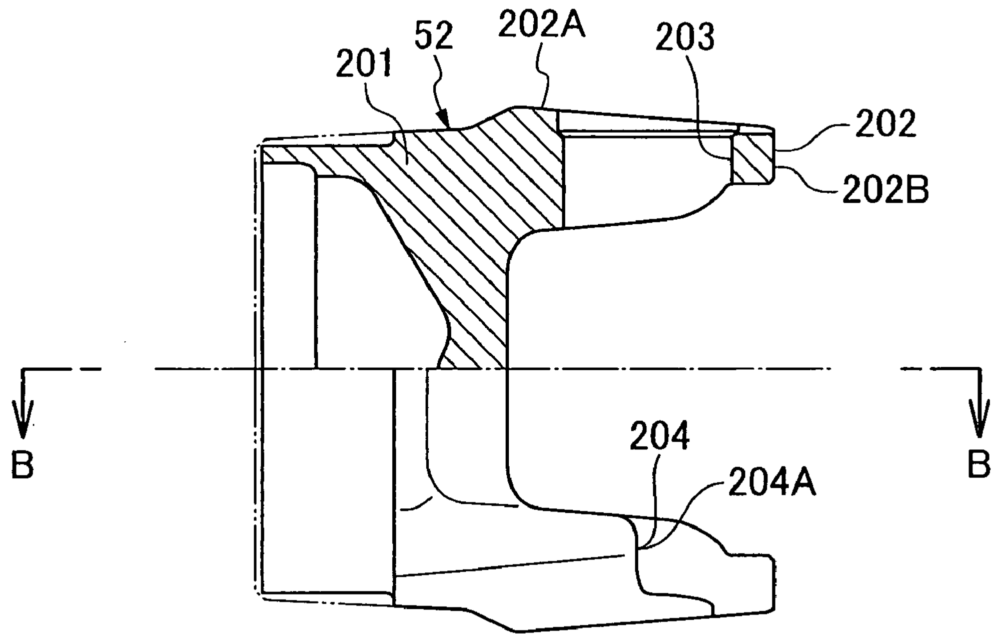
Figure 8B:
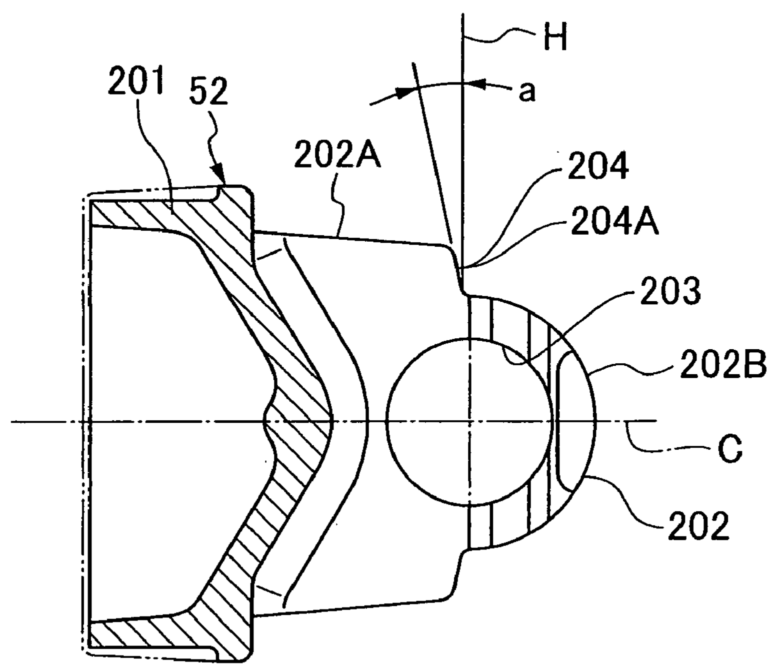

The first and second yoke stubs 51 and 52 are provided with bending angle control portions 104A and 204A coming into collision with each other at a time of being bent to a fixed maximum bending angle a with each other via the cross pin 53, respectively in shoulder surfaces 104 and 204 of the fork-shaped protruding portions 102 and 202 opposed to each other in the axial direction, as shown in FIG. 4. The first yoke stub 51 is structured such that a base end side rising up from the base portion 101 is set to a wide portion 102A, and a leading end side along an upper half periphery of the pin hole 103 is set to a narrow portion 102B, in each of the fork-shaped protruding portions 102 and 102 in both sides of the base portion 101. The step-like shoulder surface 104 is provided in a portion forming a boundary between the wide portion 102A and the narrow portion 102B in both sides approximately sandwiching a center of the pin hole 103. The second yoke stub 52 is structured such that a base end side rising up from the base portion 201 is set to a wide portion 202A, and a leading end side along an upper half periphery of the pin hole 203 is set to a narrow portion 202B, in each of the fork-shaped protruding portions 202 and 202 in both sides of the base portion 201. The step-like shoulder surface 204 is provided in a portion forming a boundary between the wide portion 202A and the narrow portion 202B in both sides approximately sandwiching a center of the pin hole 203.

In the present embodiment, the bending angle control portions 104A and 204A provided in the fork-shaped protruding portions 102 and 202 of the first and second yoke stubs 51 and 52 and coming into contact with each other come into surface contact with each other. The bending angle control portion 104A of the fork-shaped protruding portion 102 of the first yoke stub 51 is formed by the shoulder surface 104 forming a down slope from the side of the narrow portion 102B toward the side of the wide portion 102A at an angle a (for example, 10 degree) corresponding to the maximum bending angle a with respect to a horizontal surface H which is orthogonal to the center shaft C of the first yoke stub 51, in a front elevational view (FIG. 6B) of the fork-shaped protruding portion 102 and the pin hole 103. The bending angle control portion 204A of the fork-shaped protruding portion 202 of the second yoke stub 52 is formed by the shoulder surface 204 forming a down slope from the side of the narrow portion 202B toward the side of the wide portion 202A at the angle a (for example, 10 degree) corresponding to the maximum bending angle a with respect to the horizontal surface H which is orthogonal to the center shaft C of the second yoke stub 52, in a front elevational view (FIG. 8B) of the fork-shaped protruding portion 202 and the pin hole 203.

In accordance with the present embodiment, the following operations and effects can be obtained.

(a) When the first and second propeller shafts 10 and 20 are contracted by being exposed to the impact force at a time of the collision of the motor vehicle, and the propeller shafts 10 and 20 displace in the axial vertical direction while deforming the rubber-like elastic members 15 and 25 with respect to the brackets 18 and 28 in the vehicle body side, so that the first yoke stub 51 in the side of the first propeller shaft 10 and the second yoke stub 52 in the side of the second propeller shaft 20 are bent, the bending angle control portions 104A and 204A come into collision with each other. The bending angle control portions 104A and 204A oppose each other in the side coming close to each other on the basis of the bending, and are provided in the shoulder surfaces 104 and 204 of the fork-shaped protruding portions 102 and 202, in the first and second yoke stubs 51 and 52. Accordingly, the bending angles of the first and second yoke stubs 51 and 52 are controlled within the fixed maximum bending angles.

(b) As a result that the bending angles of the first and second yoke stubs 51 and 52 are controlled in accordance with the item (a) mentioned above, the first and second propeller shafts 10 and 20 can be avoided from being significantly bent, and the bent yoke stubs 51 and 52 do not interfere with the vehicle body. Accordingly, the compressing force that the first propeller shaft 10 compresses the second propeller shaft 20 in the axial direction is not largely reduced. Therefore, the first propeller shaft 10 securely compresses the second propeller shaft 20 in the axial direction so as to securely rupture the shock absorbing portion 80, and it is possible to secure a desired shock absorbing effect.

(c) The bending angle control portions 104A and 204A coming into collision with each other and provided in the fork-shaped protruding portions 102 and 202 of the first and second yoke stubs 51 and 52 are structured such as to come into collision with each other in accordance with the surface contact. Accordingly, it is possible to stabilize the collision between the bending angle control portions 104A and 204A of the first and second yoke stubs 51 and 52.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. An automotive shock absorbing propeller shaft apparatus comprising:

a first yoke stub provided in an end portion of a first propeller shaft and a second yoke stub provided in an end portion of a second propeller shaft, being coupled to each other by a cross pin so as to be bendable with each other, the first and second propeller shafts being coupled;

at least one of the first and second propeller shafts being supported to an inner ring of a rubber-like elastic member via a bearing, the rubber-like elastic member being supported to a bracket in a vehicle body side; and the first propeller shaft compressing the second propeller shaft in an axial direction so as to be capable of rupturing a shock absorbing portion when the first and second propeller shafts are contracted by being exposed to an impact force, the first yoke stub being provided with a fork-shaped protruding portion protruding in an axial direction from both sides of a first base portion and receiving one pin forming a cross shape of the cross pin, the second yoke stub being provided with a fork-shaped protruding portion protruding in an axial direction from both sides of a second base portion and receiving the other pin forming the cross shape of the cross pin, such that when the first and second yoke stubs are bent to a fixed maximum bending angle with each other via the cross pin, bending angle control portions coming into collision with each other are provided in shoulder surfaces of the fork-shaped protruding portions opposing to each other in the axial direction, wherein each of the first and second yoke stubs is structured such that a base end side rising up from the base portion is set to a wide portion, and a leading end side along an upper half periphery of the pin hole is set to a narrow portion, in each of the fork-shaped protruding portions in both sides of the base portion, and a step-like shoulder surface is provided in a portion forming a boundary between the wide portion and the narrow portion in both sides approximately sandwiching a center of the pin hole.

2. An automotive shock absorbing propeller shaft apparatus as claimed in claim 1, wherein each of the bending angle control portions of the fork-shaped protruding portions of the first and second yoke stubs is formed by a shoulder surface forming a down slope from the side of the narrow portion toward the side of the wide portion at an angle corresponding to the maximum bending angle with respect to a horizontal surface which is orthogonal to a center shaft of the first yoke stub, in a front elevational view of the fork-shaped protruding portion and a pin hole.

3. An automotive shock absorbing propeller shaft apparatus comprising:

a first yoke stub provided in an end portion of a first propeller shaft and a second yoke stub provided in an end portion of a second propeller shaft, being coupled to each other by a cross pin so as to be bendable with each other, the first and second propeller shafts being coupled;

at least one of the first and second propeller shafts being supported to an inner ring of a rubber-like elastic member via a bearing, the rubber-like elastic member being supported to a bracket in a vehicle body side; and the first propeller shaft compressing the second propeller shaft in an axial direction so as to be capable of rupturing a shock absorbing portion when the first and second propeller shafts are contracted by being exposed to an impact force, the first yoke stub being provided with a fork-shaped protruding portion protruding in an axial direction from both sides of a first base portion and receiving one pin forming a cross shape of the cross pin, the second yoke stub being provided with a fork-shaped protruding portion protruding in an axial direction from both sides of a second base portion and receiving the other pin forming the cross shape of the cross pin, such that when the first and second yoke stubs are bent to a fixed maximum bending angle with each other via the cross pin, bending angle control portions coming into collision with each other are provided in shoulder surfaces of the fork-shaped protruding portions opposing to each other in the axial direction, the bending angle control portions which come into collision with each other are provided in the fork-shaped protruding portions of the first and second yoke stubs and are structured such as to come into collision with each other via surface contact with each other, wherein each of the first and second yoke stubs is structured such that a base end side rising up from the base portion is set to a wide portion, and a leading end side along an upper half periphery of the pin hole is set to a narrow portion, in each of the fork-shaped protruding portions in both sides of the base portion, and a step-like shoulder surface is provided in a portion forming a boundary between the wide portion and the narrow portion in both sides approximately sandwiching a center of the pin hole.

4. An automotive shock absorbing propeller shaft apparatus as claimed in claim 3, wherein each of the bending angle control portions of the fork-shaped protruding portions of the first and second yoke stubs is formed by a shoulder surface forming a down slope from the side of the narrow portion toward the side of the wide portion at an angle corresponding to the maximum bending angle with respect to a horizontal surface which is orthogonal to a center shaft of the first yoke stub, in a front elevational view of the fork-shaped protruding portion and a pin hole.

* * * * *